April 18, 1939. R. AMBUHL 2,154,828
INTERLINER FOR PNEUMATIC TIRES
Filed Oct. 13, 1937
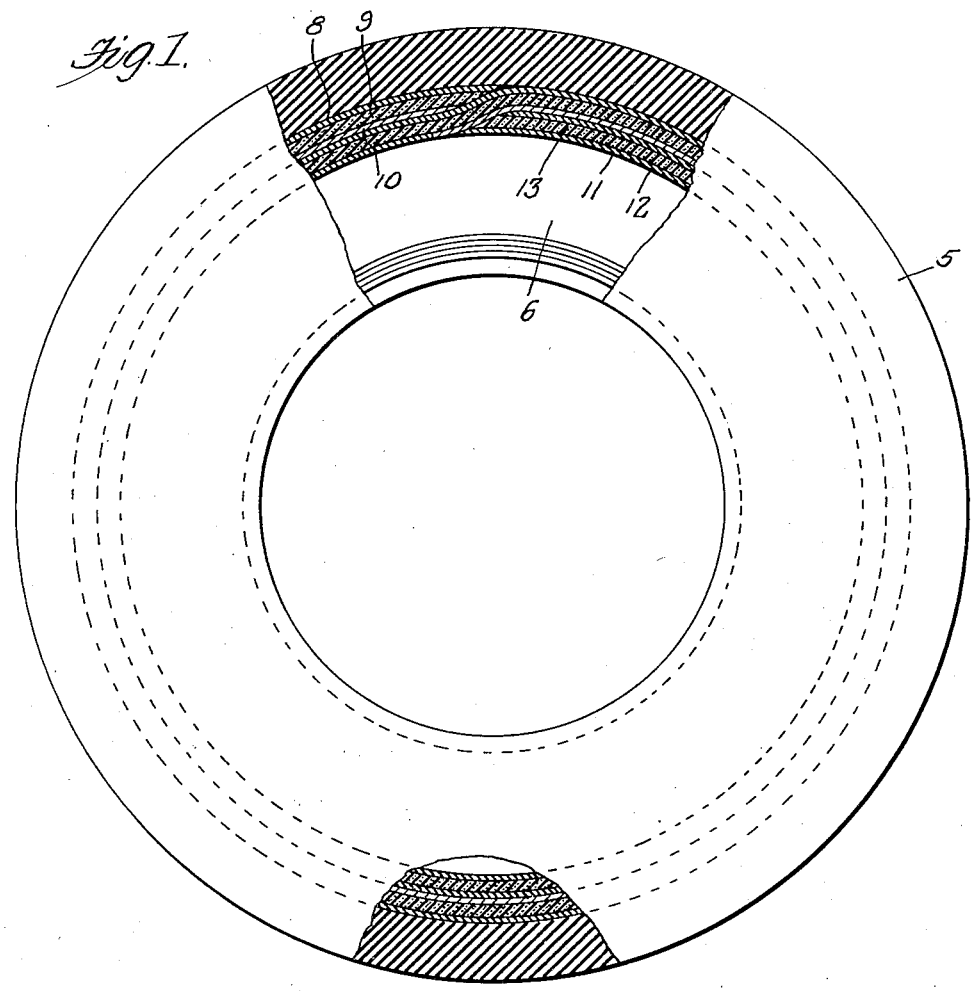
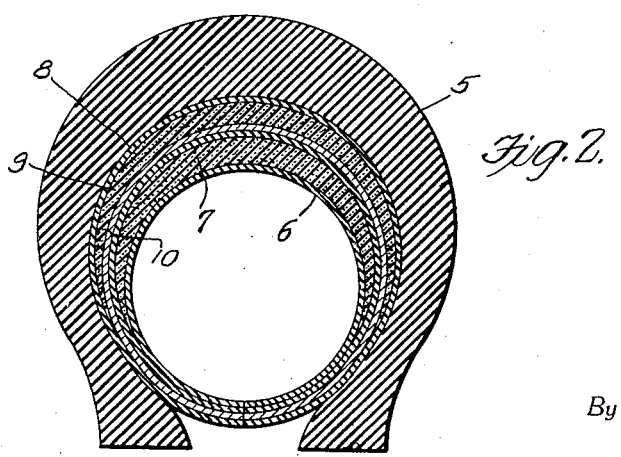
Inventor
Robert Ambuhl,
By Clarence A. O'Brien
Hyman Berman
Attorneys Patented Apr. 18, 1939

2,154,828

UNITED STATES PATENT OFFICE 2,154,828

INTERLINER FOR PNEUMATIC TIRES

Robert Ambuhl, Troy, N. Y.

Application October 13, 1937, Serial No. 168,802

1 Claim. (Cl. 152—204)

The present invention relates to pneumatic tires and has for its principal object to provide an interliner adapted to extend circumferentially around the tube within the tire casing to protect the tube from puncturing or injury by foreign matter which may work its way through the tire casing.

More specifically the invention resides in an interliner of this character of sufficient length to extend circumferentially around the tube in a double layer, said interliner being formed of an outer layer of tube rubber, an intermediate layer of sponge rubber and a canvas layer inwardly of the sponge rubber for substantially one-half the length of the liner, the remaining portion of the liner being formed of inner and outer layers of tube rubber with an intermediate layer of sponge rubber.

The invention further resides in the details of construction and arrangement of the interliner as more fully hereinafter described and claimed, reference being had to the accompanying drawing forming part hereof, wherein like numerals refer to like parts throughout and in which:

Figure 1 is a side elevational view of a tire casing with parts broken away and shown in sections and Figure 2 is a transverse sectional view therethrough.

Referring now to the drawing in detail, the numeral 5 designates a tire casing within which the inner tube 6 is adapted to be positioned. The interliner 7 is arranged in the casing between the tube and casing, said interliner comprising an elongated strip having an outer layer of tube rubber 8, an intermediate layer of sponge rubber 9 and an interlayer of canvas 10, the latter extending substantially one-half the length of the interliner. The remainder of the interliner is formed with inner and outer layers 11 and 12 respectively of tube rubber with an intermediate layer of sponge rubber 13.

In arranging the interliner within the casing the same is extended circumferentially around the inner wall of the casing and is of sufficient length to extend substantially twice around the casing to provide a double thickness of material as will be apparent from an inspection of Fig. 1 of the drawing. Accordingly before it will be possible for any foreign matter to pass through the tire and into the tube, the same must pass through the layer of tube rubber 8, the layer of sponge rubber 9, the layer of canvas 10, a second layer of tube rubber 11, another layer of sponge rubber 13 and finally a third and inner layer of tube rubber 12. The double wrapping of sponge rubber provides a material increase in thickness which prevents any ordinary nail or spike from penetrating the casing and interliner to puncture the tube, while providing the desired resiliency to the tire; the layer of canvas serves to prevent the penetration of such nail or spike beyond the outer wrapping of sponge rubber and the inner layer of rubber which contacts the tube prevents injury thereto by friction between the tube and interliner.

As more clearly shown in Fig. 2 of the drawing the sponge rubber is of decreased thickness toward the longitudinal side edges of the interliner to reduce the thickness thereof at the inner periphery of the tube as this portion of the tube does not require the protection necessary for the outer periphery thereof.

It is believed the details of construction and operation of the device will be readily understood from the foregoing without further detailed explanation.

What is claimed is:

An interliner for pneumatic tires comprising an elongated flexible member for extending circumferentially around the inner walls of a tire casing between the latter and an inner tube arranged within the tire casing and of a length to be positioned twice circumferentially about the tube in overlapping relation, said member being of laminated construction and including an outer layer of tube rubber extending the full length of the member, an intermediate layer of sponge rubber of an increased thickness over the thickness of the layer of tube rubber and extending the full length of the member, an inter-layer of fabric extending approximately one-half of the length of the member, and an inner layer of tube rubber extending the full length of the member whereby the arranging of said member twice circumferentially about the tube brings the fabric layer between the wrappings of said member for extending once circumferentially entirely around the tube and with the layers of tube rubber immediately adjacent the tube and casing and the layer of sponge rubber extending approximately twice about the tube and circumferentially of the latter.

ROBERT AMBUHL.